United States Patent
Anderson et al.

(10) Patent No.: US 7,245,778 B2
(45) Date of Patent: Jul. 17, 2007

(54) METHODS, DEVICES AND SYSTEMS FOR COMPRESSING IMAGES

(75) Inventors: Peter G. Anderson, Pittsford, NY (US); Charles Bouman, West Lafayette, IN (US); Changmeng Liu, Rochester, NY (US)

(73) Assignees: Rochester Institute of Technology, Rochester, NY (US); Purdue Research Foundation, West Lafayette, IN (US)

( * ) Notice: Subject to any disclaimer, the term of this patent is extended or adjusted under 35 U.S.C. 154(b) by 815 days.

(21) Appl. No.: 10/292,163

(22) Filed: Nov. 12, 2002

(65) Prior Publication Data

US 2004/0091163 A1 May 13, 2004

(51) Int. Cl.
  *G06K 9/36* (2006.01)
  *G06K 15/00* (2006.01)
(52) U.S. Cl. .......... 382/246; 382/237; 358/3.13
(58) Field of Classification Search ........... 382/237, 382/244–246; 358/2.99, 3.01, 3.06, 3.07, 358/3.08, 3.1, 3.13, 3.19
See application file for complete search history.

(56) References Cited

U.S. PATENT DOCUMENTS 5,555,103 A   9/1996   Anderson 6,330,362 B1   12/2001   Venkateswar

OTHER PUBLICATIONS

Kang, Henry R., "Dispersed-Dot Ordered Dither", Digital Color Halftoning, E.R. Dougherty, ed., International Society of Optical Engineering and Institute of Electrical and Electronics Engineers, Inc., pp. 279-294 (1999).

Sayood, Kahlid, "Huffman Coding", Introduction to Data Compression, 2nd Ed., Fox, E., Ed., Morgan Kaufmann Publishers, pp. 39-54 (2000).

Ulichney, Robert, "Dispersed-Dot Ordered Dither", Digital Halftoning, The Massachusettes Institute of Technology, pp. 127-142 (1987).

Denecker, Koen, et al., "A Comperative Sudy of Lossless Coding Techniques for Screened Continuous-Tone Images", (4 pages), Pubulished 1997.

Denecker, Koen, et al., "Software and Hardware Implementation of an Improved Lossless Haiftone Image Compression Algorithm", (4 pages), Published 1998.

Denecker, Koen, et al., "Design of an Improved Lossless Halftone Image Compression Codec" Signal Processing: Image Communication 17 pp. 277-292 (2002).

*Primary Examiner*—Duy M. Dang

(57) ABSTRACT

Methods, devices and systems for compressing images are provided. One method includes creating halftone mask structures and applying compression coding techniques to arrayed pixels sorted using the halftone mask structures in order to convert an image to a compressed bi-level, halftoned image.

19 Claims, 6 Drawing Sheets

METHODS, DEVICES AND SYSTEMS FOR COMPRESSING IMAGES

FIELD

The present invention relates to printer technologies, and in particular to methods, devices and systems for compressing images.

BACKGROUND

Many laser and inkjet printers currently produced cannot print the many shades of gray or color (typically 256 or more shades) that are necessary to simulate continuous grayscale or multi-color images, also referred to as contone images. These printers typically only print utilizing one color ink, e.g. cyan, magenta, yellow or black ink, and therefore, at a given space on a page, the printer can either leave the space blank or place a dot of ink thereon. By changing the density of dots, or the size of the dots, on areas of the page, an assimilation of contone images can be made. This process of mimicking a contone image through use of varied densities of dots is referred to as halftoning. In halftoning, the image being created is defined into a plurality of small cells. A number of dots are then arranged in a pattern within the cell. The number and the pattern of the dots are dependent upon the particular shade of gray or color that is to be simulated and upon the type of halftoning that is being utilized.

There are two classes into which halftoning techniques for printing applications can be divided. The first is referred to as "classical halftoning" in which the classical screen is simulated and the contone image is replaced by dots of variable size located on a fixed rotated rectangular grid. Here, each dot is created using groups of tiny laser spots. A second is referred to as "stochastic halftoning" in which the contone image is replaced by equally sized dots at varying places. The dots appear to be distributed in a stochastic or random fashion.

In photographically generated halftones, a photo sensitive media receives the image through a halftone screen, creating smaller dots for lighter areas and larger dots for darker areas. These images are considered analog images. Digitally composed printing prints only one size of dot, but varies the density of dots in an area, by clustering them together.

Originally, a halftoning procedure was performed by means of a screen, e.g. "screening." With today's increase in the power of computers, halftoning is more and more frequently performed in a digital fashion by raster image processors (RIPs). The halftoning operation is a computationally intensive application, and the resulting image sizes are large, since in forming the image a pattern of dots representing a shade of gray must be mapped rather than, for example, just a reference to the particular shade of gray that is required in a portion of a grayscale image.

In order to simulate variable-sized halftone dots in computer printers, dithering is used, which creates clusters of dots in a halftone cell. The more dots printed in the cell, the darker the shade of gray that is depicted. As the screen frequency gets higher (i.e. more cells per inch), there is less room for dots in the cell, reducing the number of shades of gray or color that can be generated.

In low resolution printers, there is always a compromise between printer resolution (dpi) and screen frequency (lpi), which is the number of rows of halftone cells per inch. For example, in a 300 dpi printer, the 8×8 halftone cell required to create 64 shades of gray results in a very coarse 38 lines per inch of screen frequency (300 dpi divided by 8). However, a high resolution, 2400 dpi imagesetter can easily handle 256 shades of gray at 150 lpi (2400/16). At this resolution, the human viewer cannot distinguish black and white dots from continuous gray.

Halftone images, also called bi-level images, tend to be very large. That is, the image can range from a few megabits (Mbit) up to several gigabits (Gbit). When images are screened at a high resolution, the size of the halftone image can be several times larger than the size of the original contone image. Hence, storage and transmission of these images can benefit from compression.

However, halftones are not typically compressible, and the methods that have been developed to date often resort to a loss of image information during the compression process called "lossy compression". Previous methods to compress halftone images may convolve the images with low-pass filters to convert them back to contone images which are then compressed with such well-known techniques such as JPEG, but this technique is a lossy compression method and therefore results in a loss of information image information.

High-resolution digital printers and growing computational requirements associated with new applications, such as printing-on-demand and personalized printing have increased the need for fast and efficient lossless halftone image compression.

DETAILED DESCRIPTION

Figure 1:
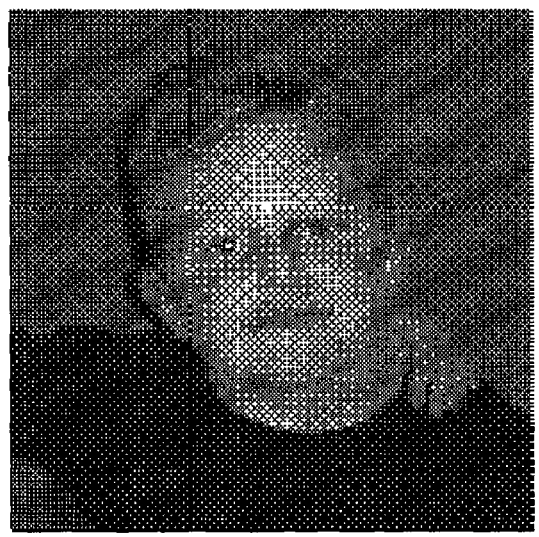
FIG. 1 is a printed photograph halftoned using a dispersed dot scheme.

The present invention provides a technique for converting continuous grayscale images or multi-colored images to halftone images in a manner that lend themselves to lossless data compression with a compression factor of two or better. This technique uses novel halftone mask structures with non-repeated threshold values that can be used as a sort key to permit a reversible rearrangement of image pixels into groups with a highly skewed distribution allowing compression coding techniques to be applied. In one embodiment, Huffman coding compression techniques are applied. However, the invention is not so limited. One of ordinary skill in the art and familiar with Huffman coding techniques or other standard compression-coding techniques will understand, upon reading this disclosure, the manner in which compression coding techniques can be applied to create the lossless halftone images of the present invention. One of ordinary skill in the art will further understand the manner in which a wide variety of other suitable statistical compression coding techniques can be applied to arrayed pixels sorted using the halftone mask structures of the invention to create lossless halftone images. The same are considered within the scope of the present invention.

Using the masks as a sort key allows the present invention to reversibly rearrange the image pixels and partition them into groups with a highly skewed distribution allowing Huffman compression coding techniques to be applied. This gives compression ratios in the range 3:1 to 10:1.

Halftone images are bi-level images consisting of two colors, such as black and white, formed using patterns whose detailed structures are nearly invisible. These images thus convey continuous tone pictures to human eyes. Halftone images can be created from a gray-scale or from a multicolor image. For example, in a color image the image can be broken down into the colors cyan, magenta, yellow, and black, and each color can be "halftoned" into a bi-level image, having either a dot of color or nothing in a given printed area. The same is true with respect to grayscale images. As one of ordinary skill in the art will appreciate from reading this disclosure, the techniques described herein can be applied to any of these four color planes. Halftone images' entropies tend to be very high hence unsuitable for typical statistical approaches to data compression. Many halftone compression approaches involve converting the image back to a continuous image, then applying JPEG or a similar method. This works, but the image may be severely degraded ("lossy compression").

The utility xv converts contone images to black and white using the Floyd-Steinberg algorithm. The Gnu or Unix utility can reduce the file sizes of the resulting images only slightly.

Other approaches to compression of halftoned images are reported. (See generally, Koen Denecker and Peter De Neve. *A comparative study of lossless coding techniques for screened continuous-tone images.* In B. Werner, editor, *Proceedings of the international conference on acoustics, speech, and signal processing* (Munich Germany), volume 4, 1997; and Koen Denecker, Dimitrie Van De Ville, Frederik Habils, Ignace Lemahieu, and Adrian Munteanu. *Software and hardware implementation of an improved lossless halftone image compression algorithm.* In *International comference on imaging science, electronic imaging* (Antwerp, Belgium), volume 2, 1998).

The mask-based halftoning introduced below produces images that compress and can be reduced by a ratio of approximately 4:1.

Halftone Conversions Via Masking

For the present discussion, input black and white images are used with image pixels satisfying $0 \leq I_{pq} \leq 1$. Similarly, the halftone masks satisfy $0 \leq M_{pq} \leq 1$, with a subscript range identical to the image's. Creation of a bi-level image, B, via a mask follows the rule $$I_{pq} < M_{pq} \Rightarrow B_{pq} = 0$$

$$I_{pq} \geq M_{pq} \Rightarrow B_{pq} = 1 \quad (1)$$

Generally, the halftone image, B, is expected to be such a high entropy mixture of black and white pixels that compression attempts are doomed. However, the rule of Eq. (1) suggests that the values of the $B_{pq}$ are not truly random or disordered, namely $$M_{pq} = Pr[B_{pq} = 0] \quad (2)$$

That is, when $M_{pq}$ is large, it is highly probable that $I_{pq} < M_{pq}$, making $B_{pq} = 0$.

Thus, according to the teachings of the present invention, by using masks with no repeated values, the pixels of B can be sorted using the values of M as a sort key. The observed tendency of one end of the sorted list to be predominantly 0's and the other end predominantly 1's can be exploited as Eq. 2 suggests. The rearranged pixel stream can be compressed. After decompression, the pixels can be rearranged to recover the original B.

Halftone Masks

Large masks of unique values will result in good bi-level images. These two goals do not conflict. In fact, for small clustered-dot masks, the unique value requirement is a benefit.

According to the teachings of the present invention, a computational rule, herein denoted by *, is defined that allows the combination of two matrices into a larger matrix. Specifically, if X and Y are matrices of dimensions $h_X \times w_X$ and $h_Y \times w_Y$, respectively, then $$Z = X \cdot Y \quad (3)$$

is a matrix with dimensions $$h_Z = h_X h_Y$$

$$w_Z = w_X w_Y \quad (4)$$

Z is given by the rule $$Z_{ph_X+q, rw_X+s} = Y_{pr} + h_Y w_Y X_{qs} \quad (5)$$

An alternative formulation of Eq. (5) is $$Z_{tu} = Y_{t/h_X, u/w_X} + h_Y w_Y X_{t \% h_X, u \% w_X} \quad (6)$$

In Eq. 6 division is integer division with no remainder, and % denotes remainder or modulo. As one of ordinary skill in the art will appreciate upon reading this disclosure, straightforward calculation establishes that * is associative.

If X and Y are permutations of the non-negative integers less than $h_X w_X$ and $h_Y w_Y$, respectively, then it is easy to see that Z is a permutation of the non-negative integers less than $h_X w_X h_Y w_Y$. Visually, one can picture Z=X*Y as a tiling of $h_X \times w_Y$ copies of the multiple $h_Y w_Y X$, where the (p,q) copy is offset by Ypr.

Matrices X which are permutations of non-negative integers less than $h_X w_X$ can be used as halftone masks in the sense above: when the elements are divided by $h_X w_X$.

In the present invention, the simplest family of halftone masks is a dispersed-dot mask, a variant of the Bayer mask. (See generally, Henry Kang. *Digital Color Halftoning.* SPIE: The International Society for Optical Engineering, Bellingham, Wash., 1999; and Robert Ulichney. *Digital Halftoning.* The MIT Press, 1987.). Starting with a 1×1 matrix $$M^{(0)} = [0] \quad (7)$$

and recursively develop a $2^k \times 2^k$ matrix $$M^{(k)} = M^{(k+1)} * \begin{bmatrix} 3 & 1 \\ 0 & 2 \end{bmatrix} \quad (8)$$

A similar construction yields a family of $3^k \times 3^k$ matrices:

$$N^{(0)} = [0] \quad (9)$$

and $$N^{(k)} = N^{(k-1)} * \begin{bmatrix} 0 & 3 & 6 \\ 2 & 5 & 7 \\ 4 & 7 & 1 \end{bmatrix} \quad (10)$$

The pattern artifacts in images halftoned using $N^{(k)}$ are slightly different from those of $M^{(k)}$.

Modern, high-addressability, electrographic printers generally do not produce acceptable images using dispersed dot halftoning schemes. As with their aged, analogue ancestors, they produce better (more reliable, less noisy) images using clustered dot schemes—albeit with dot clusters at least as fine as 150 dpi.

To create a clustered dot halftone matrix suitable for the purposes of the present invention, a starting point is a clustered dot halftone cell, $C_x^{(0)}$, such as one of the following (x=1 or 2):

$$C_1^{(0)} = \begin{bmatrix} 15 & 11 & 9 & 13 \\ 7 & 3 & 1 & 5 \\ 6 & 2 & 0 & 4 \\ 14 & 10 & 8 & 12 \end{bmatrix} \quad (11)$$

$$C_2^{(0)} = \begin{bmatrix} 27 & 19 & 23 & 31 & 37 & 45 & 41 & 33 \\ 11 & 3 & 7 & 15 & 53 & 61 & 57 & 49 \\ 9 & 1 & 5 & 13 & 55 & 63 & 59 & 51 \\ 25 & 17 & 21 & 29 & 39 & 47 & 43 & 35 \\ 32 & 40 & 44 & 36 & 30 & 22 & 18 & 26 \\ 48 & 56 & 60 & 52 & 14 & 6 & 2 & 10 \\ 50 & 58 & 62 & 54 & 12 & 4 & 0 & 8 \\ 34 & 42 & 46 & 38 & 28 & 20 & 16 & 24 \end{bmatrix} \quad (12)$$

Recursively create ever larger masks by $$C_x^{(k)} = C_x^{(k-1)} * \begin{bmatrix} 3 & 1 \\ 0 & 2 \end{bmatrix}. \quad (13)$$

The cell $C_1^{(0)}$ defined in Eq. (11) is a simple clustered dot with 16 threshold levels, growing out from the center of the cell. This 4×4 mask is constructed so that the four quadrants are translations of reflections of each other. This structure, as well as that of Eq. (12), gives us patterns of similar mask thresholds which will be repeated throughout an image at similar gray levels. This similarity and repetition allows for better compression ratios.

The cell $C_2^{(0)}$ defined in Eq. (12) is based on the cell $C_1^{(0)}$ of Eq. (11): its lower right quadrant is twice the pattern of Eq. (11), and the other quadrants follow similar rules:

$$C_2^{(0)} = \begin{bmatrix} 1 + R_r D_1 & 63 - R_r D_1 \\ 62 - D_1 & D_1 \end{bmatrix} \quad (14)$$

where $D_1 = 2 \, C_1^{(0)}$ and $R_r$ denotes row reversal. Eq. (12) gives $C_2^{(0)}$ with 64 threshold levels and an equivalent pattern when black and white are interchanged. Its effect is that of a clustered-dot halftone screen rotated 45° (also known as a "classical screen").

In case the starter-cell $C_x^{(0)}$ is a halftone cell with very few thresholds (for instance $C_1^{(0)}$), simply tiling an image with unaltered copies of $C_x^{(0)}$ would produce unacceptable halftone images-they would have striping artifacts and look like "paint by number." The modification of simple tiling given by Eq. (13) yields a huge number of thresholds: if the starting cell $C_x^{(0)}$ has $\theta_0$ distinct thresholds, then $C_1^{(k)}$ has $\theta^k = 4^k \theta_0$ thresholds. Different starting cells can be used for different color planes to effect screen rotations.

Image Rearrangement and Compression

As with a variety of compression schemes, the data to be compressed is transformed so that some low-entropy aspect is evident. Such transformations must be reversible. In the present invention, both the mask and the bi-level image are considered to be one-dimensional lists of length L=hw. The bi-level list is then sorted using the mask list as a sort key. As stated above, this transformation puts mostly 0's at the beginning of the list and mostly 1's at the end. As one of ordinary skill in the art will appreciate upon reading this disclosure, the transformation is reversible.

In the present invention, the approach to compression is to rearrange the sorted L pixels into a rectangular array of dimension K×L/K; that is, L/K columns of length K. These columns tend to begin with 0's and end with 1's and have few transitions of value within themselves. Furthermore, the columns patterns are in a very skewed distribution. The values are very far from being equally likely. To illustrate, an image halftoned using the $2^k \times 2^k$ dispersed dot mask and clustered dot mask of the present invention are presented in connection to FIGS. 1 and 2, respectively. Although the present disclosure is discussed in connection with dispersed dot masks and clustered dot masks, one of ordinary skill in the art will appreciate that other dot masks, such as green noise masks, are considered within the scope of the present invention. The images of FIGS. 1 and 2 are printed with very coarse fat-pixels to show the underlying structure.

Figure 2:
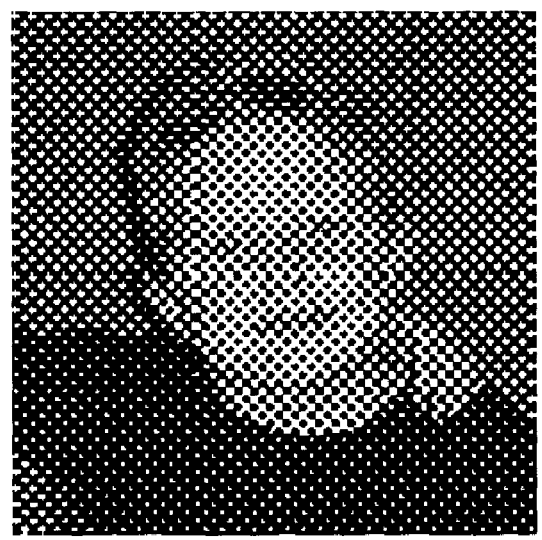
FIG. 2 is a printed photograph halftoned using the clustered dot scheme based on the classical screen.

Table 1 shows the compressions obtained for various column sizes K (the data in this table corresponds to the dispersed dot halftone of FIG. 1, but the data for FIG. 2 is almost identical). The "entropy" is the number of bits needed to encode the average K-bit column assuming an optimal coding scheme. If the probability of the n-th column pattern is $P_n$, this notion of entropy is evaluated by:

$$-\sum_n P_n \log_2 P_n \quad (15)$$

According to the teachings of the present invention, the compression ratios associated with various values of K in Table 1 are noted: the sweet spots are at the powers of 2. This is an artifact of the halftone masks which grow at powers of 2. The sorting and grouping operation puts together in single columns the pixels associated with a tiling of a component matrix X in the mask formation X*Y. (Similar sweet spots at powers of 3 with the halftone masks constructed using 3×3 building blocks are also observed.) More generally, if the starter-cell (such as the $C_x^{(0)}$ cells) has $\theta_0$ thresholds, and the large cells $C^{(k)}$ have $\theta_k = M^k \theta_0$ thresholds, then it is expected that the sweet spots for block sizes to be of the form $K = M^k \theta_0$ (in some examples, M=4 or 9). Of course this uses quite small values of M. If $C_x^{(0)}$ had an internal structure (as $C_2^{(0)}$ does), then some $M^k\theta_0$ can be divided by an appropriate integer to find good values for K. Image sorting using these masks as sort keys followed by the rearrangement into blocks with appropriate sizes K creates blocks of pixels corresponding to what are usually considered to be halftone cells (or fractions thereof) in the images.

TABLE 1

Compression ratios for the halftoned image of FIG. 1 using various block sizes. The column labeled patterns is the distinct pattern count for size = K. The column labeled bits is the estimate of the compressed file size (not counting the accompanying table).

| K | patterns | entropy | bits | ratio |
|---|---|---|---|---|
| 2 | 4 | 1.14 | 37340 | 1.76 |
| 3 | 6 | 1.41 | 30715 | 2.13 |
| 4 | 6 | 1.71 | 28002 | 2.34 |
| 5 | 12 | 2.16 | 28263 | 2.32 |
| 6 | 22 | 2.56 | 28011 | 2.34 |
| 7 | 21 | 2.99 | 28000 | 2.34 |
| 8 | 16 | 2.36 | 19363 | 3.38 |
| 9 | 43 | 3.58 | 26037 | 2.52 |
| 10 | 47 | 4.07 | 26641 | 2.46 |
| 11 | 75 | 4.31 | 25647 | 2.56 |
| 12 | 89 | 4.67 | 25493 | 2.57 |
| 13 | 109 | 5.04 | 25388 | 2.58 |
| 14 | 123 | 5.34 | 24978 | 2.62 |
| 15 | 169 | 5.57 | 24340 | 2.69 |
| 16 | 46 | 3.19 | 13069 | 5.01 |
| 32 | 115 | 4.48 | 9182 | 7.14 |
| 64 | 275 | 6.07 | 6211 | 10.55 |

Table 2 shows the 16-bit column patterns associated with the clustered dot image of FIG. 2. The bulk—over 97%—of these patterns are 0's followed by 1's (shorthand: $0^m 1^{16-m}$). This can correspond to blocks of 4×4 pixels in the original image that are relatively constant. But that is expected of images. The patterns not of the form $0^m 1^{16-m}$ can correspond to image regions with large gray-scale gradients and discontinuities.

In Table 2, 46 different patterns are presented. Each of them can be assigned a 6-bit code, yielding an immediate compression ratio of almost 3:1. However, the frequencies of the patterns are so skewed, that a further compression coding technique can be used to achieve an even greater compression ration. In some embodiments of the present invention, Huffman coding is used to achieve a compression ratio of 5:1. An accompanying table to permit decompression will add about 10% overhead to the compressed file.

TABLE 2

Frequencies of the 46 different (of the total of 4096) 16-bit column patterns of the clustered dot halftone. In this example, the most frequent 97% of the patterns are of the form $0^m 1^{16-m}$. The horizontal line occurs just above the first example not of that form.

| count | pattern | code |
|---|---|---|
| 916 | 0011111111111111 | 11 |
| 857 | 0000001111111111 | 10 |
| 819 | 0000011111111111 | 011 |
| 252 | 0000000011111111 | 0101 |
| 249 | 0000000000111111 | 0011 |
| 239 | 0000000001111111 | 0001 |
| 151 | 0000000111111111 | 01001 |
| 145 | 0111111111111111 | 01000 |
| 133 | 0000111111111111 | 00101 |
| 131 | 0001111111111111 | 00100 |
| 84 | 0000000000011111 | 00001 |
| 18 | 0010111111111111 | 00000011 |

TABLE 2-continued

Frequencies of the 46 different (of the total of 4096) 16-bit column patterns of the clustered dot halftone. In this example, the most frequent 97% of the patterns are of the form $0^m 1^{16-m}$. The horizontal line occurs just above the first example not of that form.

| count | pattern | code |
|---|---|---|
| 12 | 0001011111111111 | 00000101 |
| 12 | 0000001011111111 | 00000111 |
| 10 | 0000000101111111 | 000000101 |
| 7 | 0001000111111111 | 000001101 |
| 7 | 0000001001111111 | 000001100 |
| 6 | 0001010111111111 | 0000001001 |
| 5 | 0000000010111111 | 0000001000 |
| 3 | 0011111101111111 | 0000000000 |
| 3 | 0000111100111111 | 0000010010 |
| 3 | 0000010111111111 | 0000010011 |
| 3 | 0000001101111111 | 0000010000 |
| 3 | 0000000001011111 | 0000010001 |
| 2 | 0101111111111111 | 00000001110 |
| 2 | 0001111101111111 | 00000001111 |
| 2 | 0001000101111111 | 00000001100 |
| 2 | 0000001000111111 | 00000001101 |
| 2 | 0000000100111111 | 00000001010 |
| 2 | 0000000000001111 | 00000001011 |
| 1 | 0111111100001111 | 000000000000 |
| 1 | 0101010111111111 | 000000000001 |
| 1 | 0010101111111111 | 000000000010 |
| 1 | 0010001011111111 | 000000000011 |
| 1 | 0001110111111111 | 000000000100 |
| 1 | 0000111110111111 | 000000000101 |
| 1 | 0000111101111111 | 000000000110 |
| 1 | 0000101011111111 | 000000000111 |
| 1 | 0000100101111111 | 000000001000 |
| 1 | 0000011110111111 | 000000001001 |
| 1 | 0000011101111111 | 000000001010 |
| 1 | 0000010101111111 | 000000001011 |
| 1 | 0000000110111111 | 000000001100 |
| 1 | 0000000010011111 | 000000001101 |
| 1 | 0000000011101111 | 000000001110 |
| 1 | 0000000011011111 | 000000001111 |

Huffman Coding of the Column Patterns

The next problem to be addressed by the present invention, is how to assign short codes to the most frequent patterns and longer codes to the less frequent ones (cf. Morse code: the most frequent letter got the shortest codes). In some embodiments, this is achieved by Huffman code. (See generally, Khalid Sayood. *Introduction to Data Compression*. Morgan Kaufmann, 1996).

Huffman code converts a sequence of "messages" (in the present case, that sequence is the list of column patterns) into bit strings of varying lengths. It does this in such a way as to obviate any separator between codes for subsequent messages. A rough explanation of the encoding mechanism is the following. The collection of messages with their associated frequencies is successively reduced by combining the two messages with the lowest frequencies into a single message, but discriminating between them using the last bit, 0 for one, and 1 for the other. This continues until all messages have been combined into a single one. The Huffman codes for the 16-bit patterns are shown in Table 2 with their frequencies. The three most frequent patterns, making up 63% of the patterns, use 2 or 3 bit codes.

File Formats for Compressed Images

The pattern frequencies will be particular to a given image. Therefore enough information must be stored with the compressed image to allow for decompression. There are several approaches to this.

One approach is to include a version of the frequency table (the first two columns of Table 2). According to the teachings of the present invention, a version of the frequency table can be stored using 16 bits for each pattern and 12 bits for frequencies at a cost of 1,288 bits. The compressed image in this case required 13,319 bits, so this overhead is acceptable. A small amount of additional overhead must be used to encode the table length and any other image parameters, but those will not add appreciable overhead. For this worked out example, the compression ratio is approximately 5:1.

Software, Devices and Systems

Embodiments of the present invention include software, application modules, and computer executable instructions operable on devices and systems described herein. The embodiments, however, are not limited to any particular programming language. Thus, the invention includes a set of instructions executable by an information handling system, having processor and memory capabilities, to produce the embodiments described herein.

Figure 3:
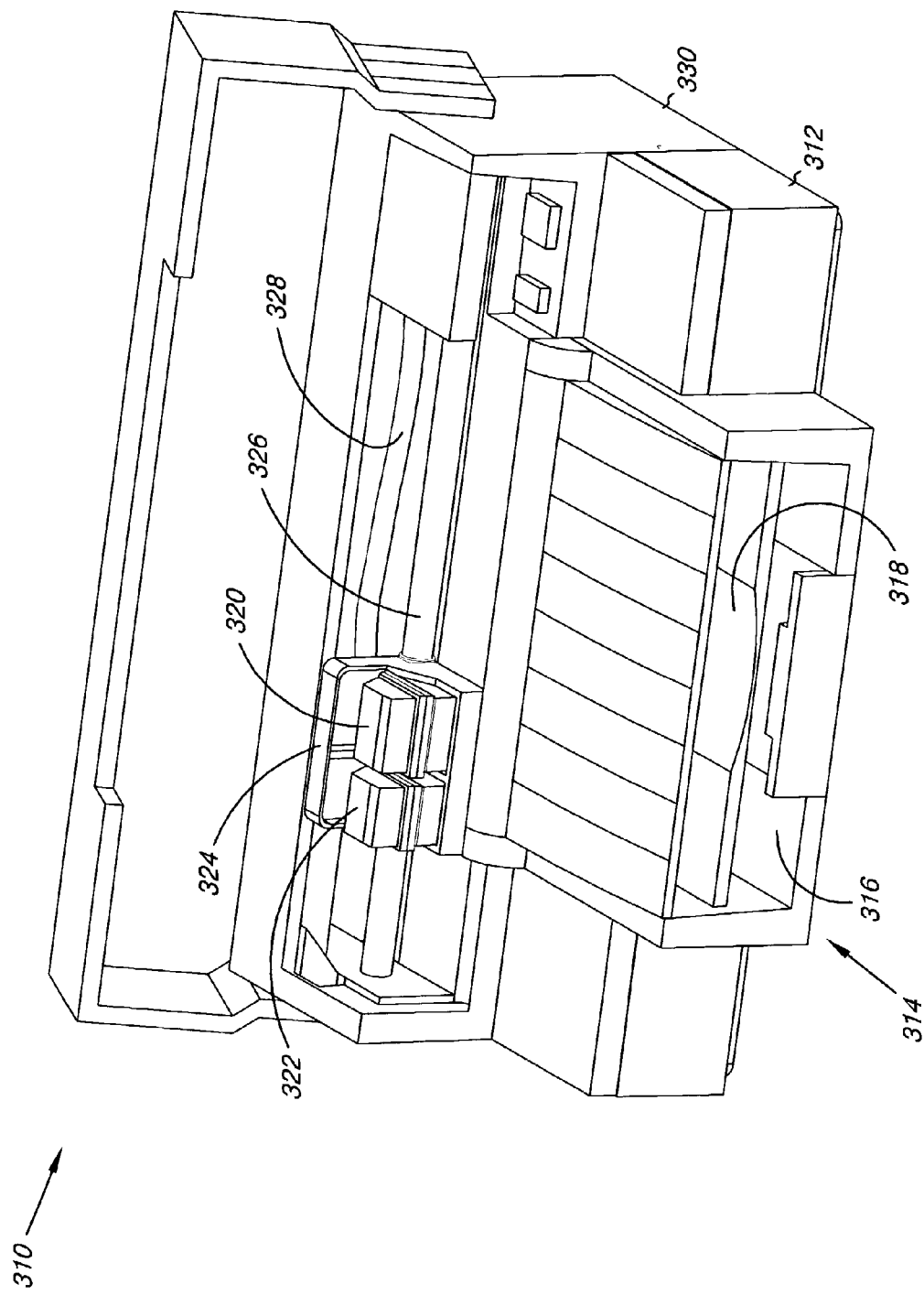
FIG. 3 illustrates an embodiment of a hardcopy printing device.

FIG. 3 illustrates an embodiment of a hardcopy printing device, here an inkjet printer 310, which may be used in an office or home environment for business reports, correspondence, desktop publishing, and the like. While it is apparent that the printer components may vary from model to model, the typical inkjet printer 310 includes a chassis 312 and a print medium handling system 314 for supplying a print medium 315, such as a sheet of paper, to the printer 310. In addition to paper 315, the print medium may be any type of suitable sheet material, such as card-stock, transparencies, Mylar, foils, and the like, but for convenience, the illustrated embodiment is described using paper as the print medium. The print medium handling system 314 includes a feed tray 316, an output tray 318, and a series of rollers (not shown) for delivering the sheets of paper from the feed tray 316 into position for receiving ink from an inkjet cartridge, such as a color ink cartridge 320—and/or a black ink cartridge 322. The illustrated color cartridge 320 is a tri-color pen, although in some embodiments (not shown), a group of discrete monochrome pens may be used, or a single monochrome black pen 322 may be used.

The cartridges or pens 320, 322 are transported by a carriage 324 which may be driven along a guide rod 326 by a conventional drive belt/pulley and motor arrangement (not shown). The pens 320, 322 may be conventional pens, which selectively deposit one or more ink droplets on a sheet of paper 315 in accordance with instructions received via a conductor strip 328 from a printer controller 330 located within chassis 312, for instance at the location shown in FIG. 3. The controller 330 generally receives instructions from a computer (not shown), such as a personal computer. A monitor (not shown) coupled to the computer may be used to display visual information to an operator, such as the printer status or a particular program being run on the computer. Personal computers, their input devices, such as a keyboard and/or a mouse device (not shown), and monitors are all well known to those skilled in the art.

Figure 4A:
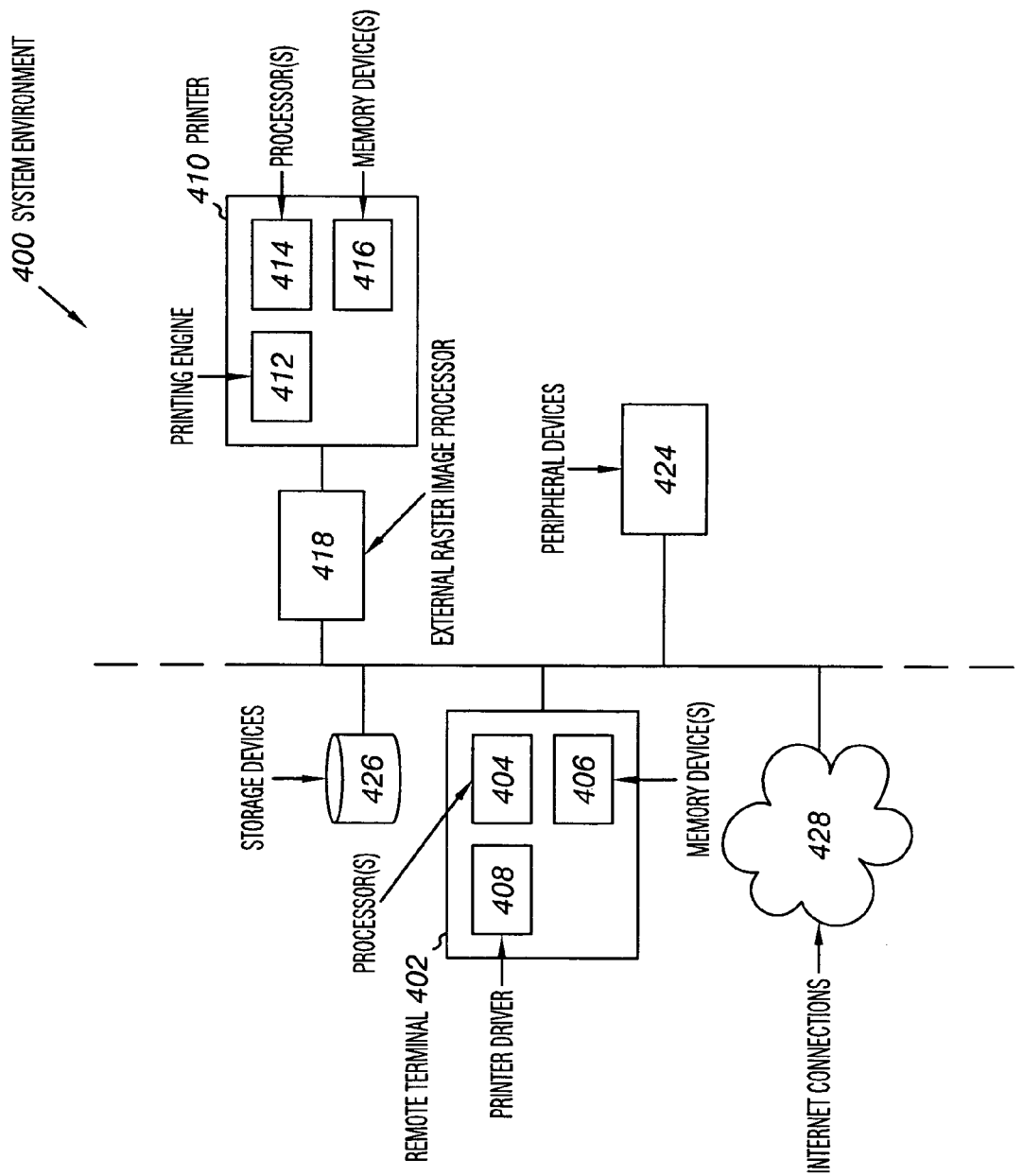
FIG. 4A illustrates a system environment according to an embodiment of the invention.

FIG. 4A illustrates a system environment 400 according to an embodiment of the present invention. As shown in FIG. 4A, the system includes a remote terminal 402. In various embodiments, the remote terminal 402 can include a desktop computer, laptop computer, a workstation, or other host computer as the same will be known and understood by one of ordinary skill in the art. The remote terminal 402 can include one or more processors 404 and one or more memory devices 406 suitable for running software and/or application modules thereon. In the embodiment shown in FIG. 4A, the remote terminal includes a printer driver 408.

As one of ordinary skill in the art will understand upon reading this description, a printer driver 408 is operable to create an instruction set for a print job which can be sent to a printing engine for rendering an image. Printer driver 408 includes any printer driver suitable for carrying out the aspects of the present invention. That is, the printer driver 408 can take output from applications running on remote terminal 402 and transform them into a print job.

In various embodiments of the present invention, the printer driver outputs an instruction set in Page Description Language (PDL). For purposes of this invention, a PDL is a device independent, high level language for instructing the printing engine of a printer to print text and graphics on a page. Two such languages are Adobe's Postscript and Hewlett-Packard's PCL (print control language).

As shown in FIG. 4A, remote terminal 402 is connected to a printer 420 via system 400. Printer includes a printing engine 412, or printer raster image processor 412. Printer 410 can include one or more processors 414 and one or more memory devices 416 suitable for running software and/or application modules thereon. As one of ordinary skill in the art will understand upon reading this description, the software and/or application modules include any software and/or or application modules suitable for carrying out the aspects of the present invention.

As one of ordinary skill in the art will appreciate, system environment 400 includes a network having data links. Further, as one of ordinary skill in the art will appreciate, the network can include any number of network types including, but not limited to a Local Area Network (LAN), a Wide Area Network (WAN), and the like. Likewise, data links can include any combination of direct wired and wireless connections, including by not limited to electrical, optical and RF connections.

In the embodiment of FIG. 4A, remote terminal 402 is connected to printer 410 via an external raster image processor (RIP) 418. That is, a RIP which is external to the printer 410. RIP 418 includes one or more processors 420, and one or more memory devices 422 suitable for running software and/or application modules thereon. However, those of ordinary skill in the art will understand upon reading this disclosure and from practicing the invention that the memory for temporary storage and data communication lines may be solely within a printer or other device or may be distributed among and between two or more components, such as printers, computers, and the like.

As one of ordinary skill in the art will understand upon reading this description, the software and/or application modules include any software and/or application modules suitable for carrying out the aspects of the present invention. Such software and/or application modules can be resident in one location or in several and even many locations, such as in a distributed computing environment, throughout a system.

Further, as shown in the embodiment of FIG. 4A, a system 400 can include other peripheral devices 424, storage devices 426, and Internet connections 428 as the same can be included within a network.

Figure 4B:
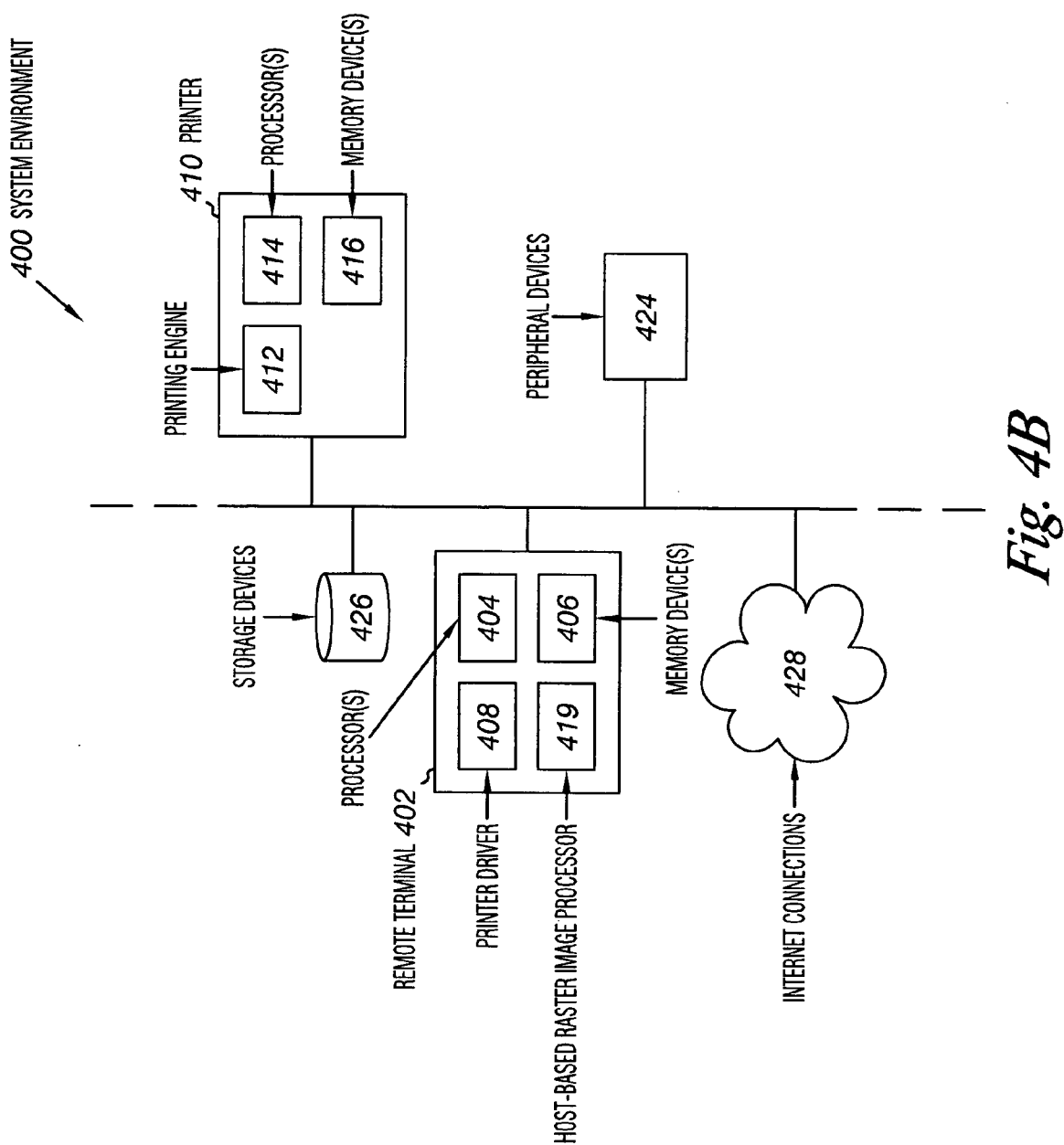
FIG. 4B illustrates another system environment according to an embodiment of the invention.

FIG. 4B illustrates another system environment 401 according to the teachings of the present invention. The system 401 shown in FIG. 4B is similar to the system 400 shown in FIG. 4A and is operable to perform various aspects according to the teachings of the present invention. However, in the embodiment of FIG. 4B, a host-based RIP 419 is provided. In one embodiment, as shown in FIG. 4B, host-based RIP 419 is included within remote terminal 402.

As one of ordinary skill in the at will appreciate upon reading this disclosure, host-based RIP 419 is similar to the external RIP shown in FIG. 4A in that it is operable to perform various aspects of the present invention.

As state above, printer driver 408 includes any printer driver which is suitable for carrying out the aspects of the present invention. That is, the printer driver 408 can take output from applications running on the remote terminal 402 and transform them into a print job.

In various embodiments of the present invention, the printer driver outputs an instruction set in Page Description Language (PDL). According to the various aspects, the printer driver 408 outputs the PDL to either an external RIP 418 (as shown in FIG. 4A) or to a host-based RIP 419 (shown in FIG. 4B). As stated above, RIPs are designed to generate output image data based on a compact input representation such as a PDL instruction set. Each page contained in a PDL instruction set can be parsed and operated upon by software to further process, resolve, and/or interpret the instruction set commands of a print job.

A traditional dedicated RIP will output a video-ready-data (VRD) instruction set. The VRD format includes an instruction set which has been PDL parsed, rendered, color converted, halftoned, and compressed in a format a printer can take as an image directly to a sheet of paper. Essentially, in the VRD format, no additional instruction set processing is performed by the printing engine to transfer the image to the sheet of paper. The present invention provides novel methods, devices and systems for compressing digital halftoned images. The VRD format typically creates high network traffic on a system, such as system 400 of FIG. 4A or system 401 of FIG. 4B. The novel methods, devices and systems for compressing digital halftoned images contained herein alleviate this network traffic as well as reducing storage requirements.

Figure 5:
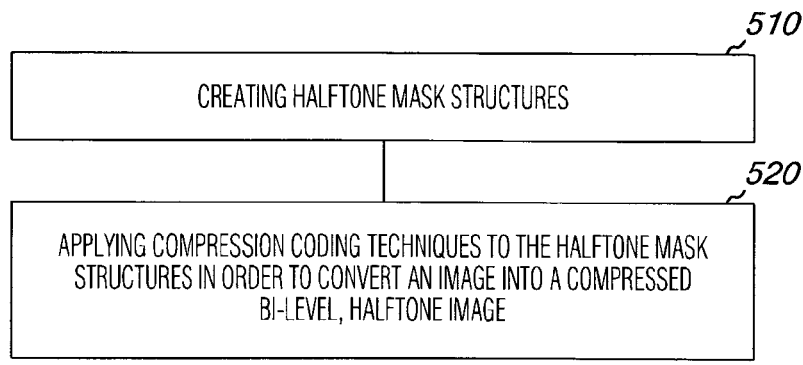
FIG. 5 is a flow chart illustrating a method according to an embodiment of the invention.
Figure 6:
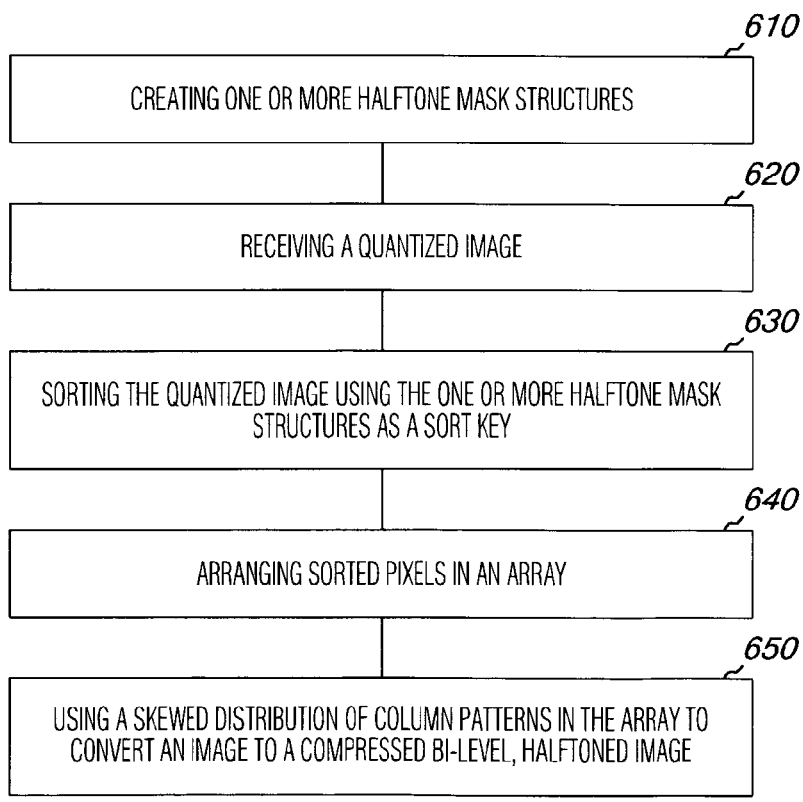
FIG. 6 is a flow chart illustrating another method according to an embodiment of the invention.
Figure 7:
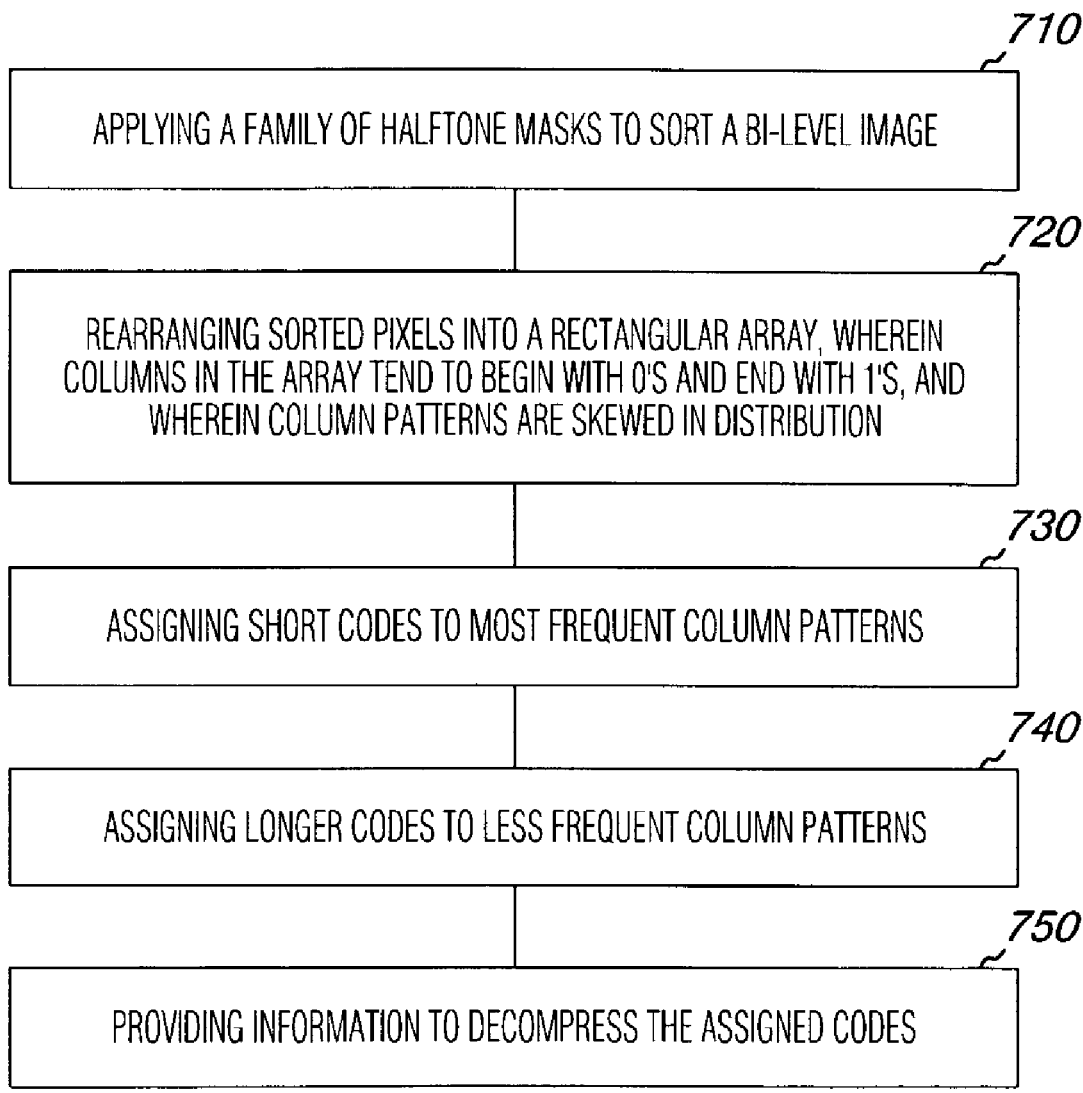
FIG. 7 is a flow chart illustrating another method according to an embodiment of the invention.

FIGS. 5-7 are block diagrams illustrating various method aspects of the invention. As one of ordinary skill in the art will understand, the methods can be performed by software, application modules, and computer executable instructions operable on the systems and devices shown herein or otherwise. The invention, however, is not limited to any particular operating environment or to software written in a particular programming language.

FIG. 5 is a block diagram illustrating one method according to an embodiment of the present invention. It should be understood by those of skill in the art that one or more of the steps of the methods provided herein may be executed in a different order than that described herein and that the elements of each method claim do not need to be executed in the order shown unless it is stated herein that such order is explicitly required. As shown in FIG. 5, a method for compressing images is provided. The method includes creating halftone mask structures at block 510. In some embodiments, creating halftone mask structures includes creating halftone mask structures with non-repeated threshold values that permit a reversible rearrangement of pixels into groups with highly skewed distribution.

The method further includes applying compression coding techniques to arrayed pixels sorted using the halftone mask structures in order to convert an image to a compressed bi-level, halftoned image at block 520. In some embodiments, applying compression coding techniques includes applying a compression coding techniques which give a 5 or greater factor file size compression ratio. In some embodiments, applying compression coding techniques to convert an image to a compressed bi-level, halftoned image includes providing lossless halftone image compression. In some embodiments, applying compression coding techniques includes applying Huffman coding techniques.

FIG. 6 is a block diagram illustrating one method according to an embodiment of the present invention. As shown in FIG. 6, a method for image handling is provided. The method includes creating one or more halftone mask structures at block 610. In some embodiments, creating one or more halftone mask structures includes creating matrices which are permutations of non-negative integers less than hxwx.

The method includes receiving a quantized image at block 620. The method includes sorting the quantized image using the one or more halftone mask structures as a sort key in block 630. The method further includes arranging sorted pixels in an array in block 640. In some embodiments, arranging sorted pixels in an array includes arranging the sorted pixels in an 8 by W array, wherein 8×W is equal to the number of image pixels.

As shown in the embodiment of FIG. 6, the method includes using a skewed distribution of column patterns in the array to convert an image to a compressed bi-level, halftoned image at block 650. In some embodiments, using a skewed distribution of column patterns in the array includes applying Huffman coding techniques. In various embodiments, using a skewed distribution of column patterns in the array to convert an image to a compressed bi-level, halftoned image includes creating a compressed file size which is 20 percent or less that of an uncompressed file size. In various embodiments, using a skewed distribution of column patterns in the array to convert an image to a compressed bi-level, halftoned image includes providing a lossless compressed image.

FIG. 7 is a block diagram illustrating one method according to an embodiment of the present invention. As shown in FIG. 7, the method includes applying a family of halftone masks to sort one or more bi-level images at block 710. In various embodiments, applying a family of halftone masks includes applying a family of dispersed dot masks. In various embodiments, applying a family of halftone masks includes applying a family of clustered dot masks. In various embodiments, applying a family of halftone mask to sort a bi-level image includes sorting a bi-level image which is a one-dimensional list having a length (L) equal to hw, and applying each halftone mask includes applying a mask which is a one-dimensional list having a length (L) equal to hw. At block 720, the method includes rearranging sorted pixels into a rectangular array such that columns in the array tend to begin with 0's and end with 1's, and such that column patterns are skewed in distribution. In various embodiments, rearranging sorted pixels into a rectangular array includes rearranging sorted L pixels into a rectangular array of dimensions K×L/K, the array having L/K columns of length K. In various embodiments, rearranging sorted pixels into a rectangular array of dimensions K×L/K creates blocks corresponding to halftone cells in for the one or more bi-level images. In various embodiments, rearranging sorted pixels into a rectangular array of dimensions K×L/K creates column patterns with over 97 percent of column patterns having a 0 followed by a 1.

The method includes assigning short codes to most frequent column patterns at block 730. At block 740 the method includes assigning longer codes to less frequent column patterns. As shown at block 750, the method further includes providing information for decompressing the assigned codes. In various embodiments, providing decompression information for the assigned codes includes including a version of a frequency table with a compressed image.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure in not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computer readable medium having computer executable instructions stored thereon which when executed by a processor cause a device to perform a method, comprising:
   applying a family of halftone masks to sort one or more bi-level images;
   rearranging sorted pixels into a rectangular array, wherein columns in the array tend to begin with 0's and end with 1's, and wherein column patterns are skewed in distribution;
   assigning short codes to most frequent column patterns;
   assigning longer codes to less frequent column patterns; and
   providing a compressed bi-level, halftoned image.

2. The computer readable medium of claim 1, wherein applying a family of halftone masks includes applying a family of dispersed dot masks.

3. The computer readable medium of claim 1, wherein applying a family of halftone masks includes applying a family of clustered dot masks.

4. The computer readable medium of claim 1, wherein applying a family of halftone mask to sort a bi-level image includes sorting a bi-level image which is a one-dimensional list having a length (L) equal to hw, and wherein applying each halftone mask includes applying a mask which is a one-dimensional list having a length (L) equal to hw.

5. The computer readable medium of claim 4, wherein rearranging sorted pixels into a rectangular array includes rearranging sorted L pixels into a rectangular array of dimensions K×L/K, the array having L/K columns of length K.

6. The computer readable medium of claim 5, wherein rearranging sorted pixels into a rectangular array of dimensions K×L/K creates blocks corresponding to halftone cells in for the one or more bi-level images.

7. The computer readable medium of claim 6, wherein rearranging sorted pixels into a rectangular array of dimensions K×L/K creates column patterns with over 90 percent of column patterns having a 0 followed by a 1.

8. The computer readable medium of claim 1, wherein the method further includes providing decompression information for the assigned codes.

9. The computer readable medium of claim 8, wherein providing decompression information for the assigned codes includes including a version of a frequency table with a compressed image.

10. A system, comprising:
    a host computer having a printer driver;
    a printer having a printing engine;
    a raster image processor (RIP) coupled to the host computer and the printer, the RIP operable to receive a print job instruction set from the host computer;
    an arraying system that arrays pixels in the print job, wherein columns in the array tend to have patterns that begin with 0's and end with 1's; and
    a coding system that skews a distribution of the array and assigns short codes to most frequent column patterns and longer codes to less frequent column patterns to produce a lossless bi-level image compression for transmission to the printer.

11. The system of claim 10, wherein the arraying system uses halftone masks to sort quantized data in the print job, the halftone masks include matrices which are permutations of non-negative integers.

12. The system of claim 11, wherein the arraying system rearranges sorted quantized data into blocks of pixels corresponding to halftone cells.

13. The system of claim 10, wherein the coding system recognizes patterns in the blocks of pixels and operable to convert a list of column patterns into bits strings of varying lengths.

14. The system of claim 10, wherein the coding system is operable to produce a lossless bi-level image compression is operable to produce a lossless bi-level color image compression.

15. A system, comprising:
    a host computer having a printer driver;
    a printer having a printing engine;
    a raster image processor (RIP) coupled to the host computer and the printer, the RIP operable to receive a print job instruction set from the host computer;
    software means operable on the system for arraying pixels in the print job, wherein columns in the array tend to have patterns that begin with 0's and end with 1's; and
    software means operable on the system for skewing a distribution of the array and assigning short codes to most frequent column patterns and longer codes to less frequent column patterns to produce a lossless, bi-level image compression for transmission to the printer.

16. The system of claim 15, wherein the software means for arraying pixels includes software means operable for using halftone masks to sort quantized data in the print job, the halftone masks including matrices which are permutations of non-negative integers.

17. The system of claim 16, wherein the software means for arraying pixels includes software means operable to rearrange sorted quantized data into blocks of pixels corresponding to halftone cells.

18. The system of claim 15, wherein the software means operable for skewing the distribution of the array includes software operable to recognize patterns in the blocks of pixels and operable to convert a list of column patterns into bits strings of varying lengths.

19. The system of claim 15, wherein the software means operable to produce a lossless bi-level image compression is operable to produce a lossless bi-level color image compression.

* * * * *

UNITED STATES PATENT AND TRADEMARK OFFICE
CERTIFICATE OF CORRECTION

PATENT NO. : 7,245,778 B2
APPLICATION NO. : 10/292163
DATED : July 17, 2007
INVENTOR(S) : Peter G. Anderson et al.

Page 1 of 1

It is certified that error appears in the above-identified patent and that said Letters Patent is hereby corrected as shown below:

In column 6, line 10, delete "$C_1^{(k)}$" and insert -- $C_x^{(k)}$ --, therefor.

Signed and Sealed this

Fourteenth Day of April, 2009

JOHN DOLL
*Acting Director of the United States Patent and Trademark Office*